United States Patent [19]

D'Amico

[11] 3,934,838

[45] Jan. 27, 1976

[54] FLOATABLE TOW-LINE HOLDER

[76] Inventor: Paul M. D'Amico, 2709 S. 12th St., Philadelphia, Pa. 19148

[22] Filed: June 14, 1971

[21] Appl. No.: 152,956

Related U.S. Application Data

[62] Division of Ser. No. 828,072, May 1, 1969, Pat. No. 3,596,300.

[52] U.S. Cl. .............................................. 242/85.1
[51] Int. Cl. .......................................... B65h 75/36
[58] Field of Search ........................... 242/85.1, 96

[56] References Cited
UNITED STATES PATENTS

| | | | |
|---|---|---|---|
| 1,454,050 | 5/1923 | Gruenhagen | 242/85.1 |
| 2,420,861 | 5/1947 | Carlson | 242/85.1 |
| 2,532,394 | 12/1950 | D'Amico | 242/85.1 |
| 2,866,436 | 12/1958 | Swain | 242/96 X |
| 3,174,702 | 3/1965 | French | 242/85.1 |

Primary Examiner—Edward J. McCarthy

[57] ABSTRACT

The invention relates to improvements and innovations in a compact embodiment and device, which is a Floatable Tow-Line Holder Storer and suitably coacts in a reel-like performance, when adapted for use in line-storing or for line-towing, as in skiing for boating or otherwise, and as a Safety-Device in police and military rescue-work in marine and field, meeting product safety standards.

2 Claims, 8 Drawing Figures

FLOATABLE TOW-LINE HOLDER

CROSS REFERENCE TO RELATED APPLICATIONS

The invention is a divisional from my copending application, Titled: "Devices and accessories for and with line holder-cutter hand tool combination." Ser. No. 828,072 dated May 1, 1969, now U.S. Pat. No. 3,596,300.

BRIEF SUMMARY

The invention basically and more particularly concerns in producing a device as a hand-holding, hand-gripping and line-storing reel-like means, permitting line ingress and egress and line-locking, which is floatable, light, easy to mass-produce and attractively colored for easy identity in rescue-work in marine and field, and;

In a device which almost completely eliminates conventional spools or reels, and everpresent make-shift, haphazard, cumbersome and dangerous methods as is found when said line is wrapped or wound to a piece of wood or wire, with no regard to completeness and advantageous working factors which are offered in these disclosures.

Another object of the invention is to produce a relatively flat embodiment which prevents accidental rolling and arrests unintended unwinding, yet; permits coactingly, lines ingress and egress as an automatic and eveready tool-means.

Another object of this invention is to produce not only, a conbination device for use in towing and skiing, but also many other uses, such as; bundling, tieing, netting, including hand or anchor-line in fishing and boating.

Still further, another object of this invention is to produce a combination line-storing device, having compact entity means and which may be attractively colored for quick and easy identity in meeting demands and emergencies, in life-saving at public beaches, and police and military rescue-work in marine and field.

Other objects will be apparent from the following drawings, wherein:

BRIEF DESCRIPTION

Figure 2:
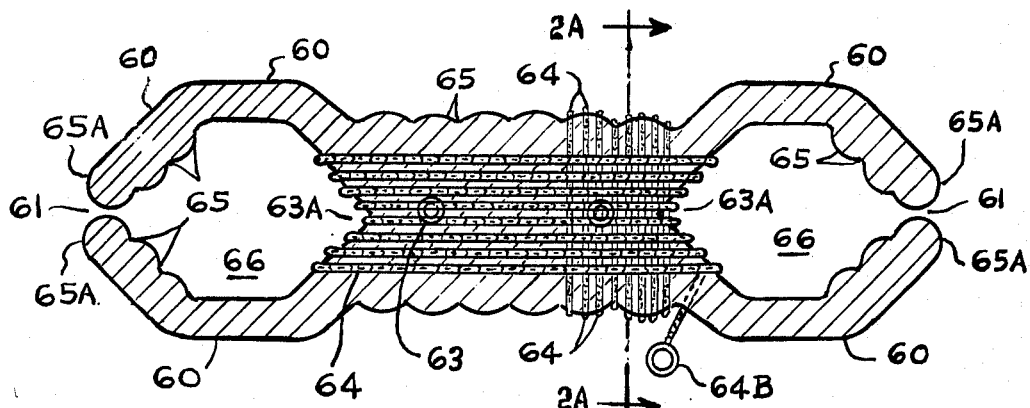
Figure 2A:
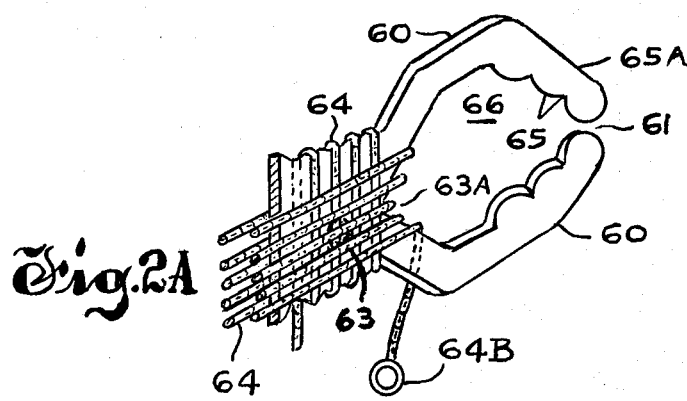
Figure 3:
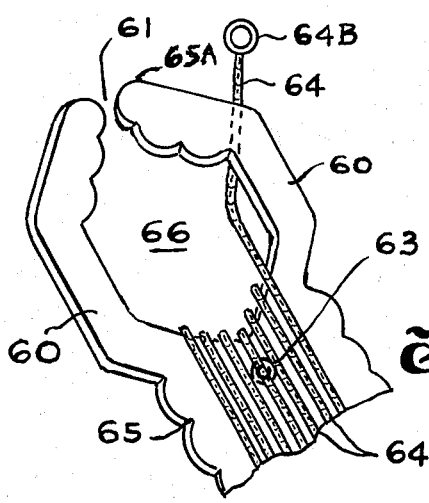
Figure 3A:
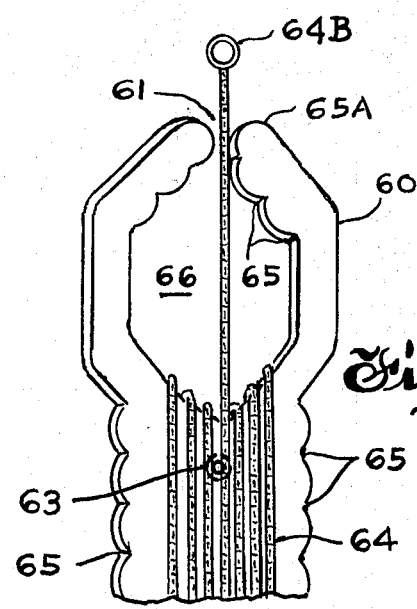

FIG. 2 is an overall elevational view to indicate the fullness of said primary embodiment which includes a rapid crosswise and lengthwise line-winding with a utility-ring (which is optional) and followed with arrows 2A as looking toward FIG. 2A; while FIG. 2A indicates a cutaway view to show in a furtherly manner the positioning of said windings; and FIG. 3 is another cutaway view to indicate said line-locking means when said embodiment is hanging fully and freely in mid-air, gravitational-wise and aided by contoured and conformed bifurcating arms; FIG. 3A is another cutaway view to indicate furtherly for clarity of illustration the line-locking means at line passage, when said embodiment is hanging up and down lengthwise, and line-locking is performed by the elasticity of both archaic and bifurcating arms coacting as feeler-sensers, and allowing line ingress and line egress by a light amount of pre-set concentrated pressure.

Figure 1:
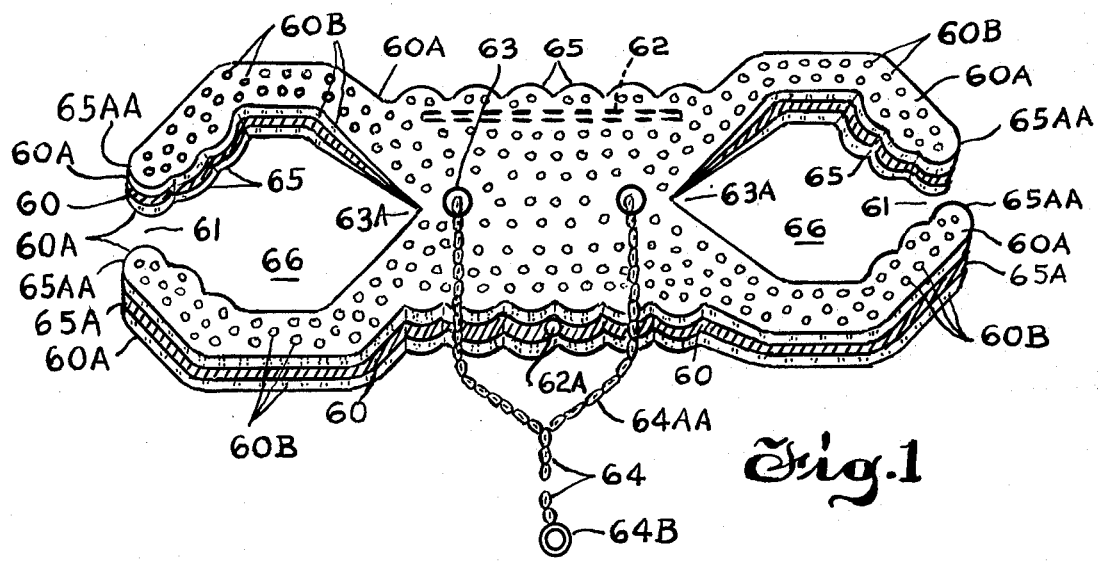
FIG. 1 is a top plan view of the line holder-storer embodiment as positioned within the grasp of said outer shell-cover, also providing stabilizer and utility loop securing holes with full penetration to indicate operation as a single or unitary embodiment and as combined, including said tow-rope and a utility-ring. (Which is optional for the many forms of clips known.)
Figures 1A, 1B:
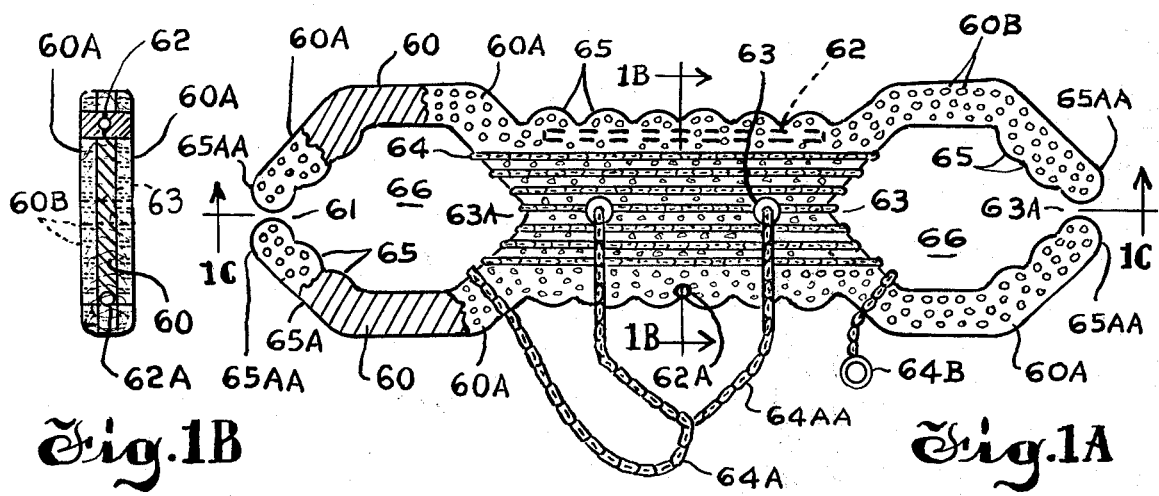
FIG. 1A is another plan view with a portion cutaway for clarity of illustration to indicate the inserted primary embodiment, with aligned holes and said utility loop, hinge and push-lock arrangement which could otherwise become two elongated halves positioned with said primary embodiment as in sandwiching and bonded by cementing, with arrows 1B are looking in the direction of FIG. 1B.
FIG. 1B is a side elevational view to indicate the positioning of said primary embodiment in said shield-cover, and having a hinge and push-look assembly, though as stated bonding two separate and elongated halves by cementing, if found more economical and feasible in production-wise operations.
Figure 1C:
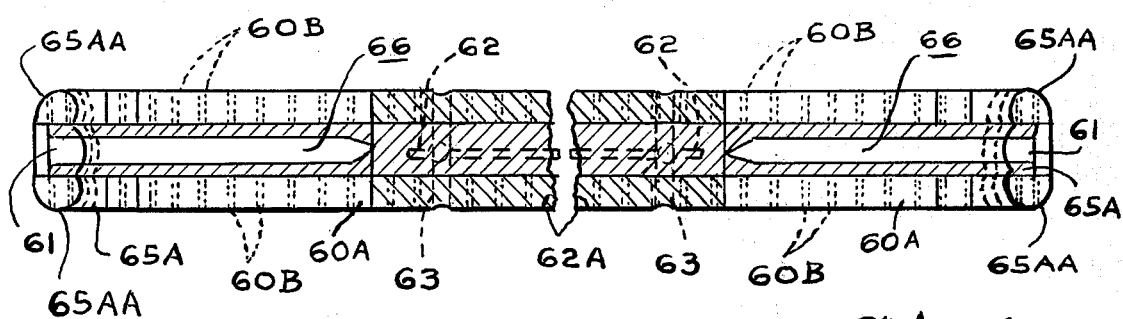
FIG. 1C is a outaway lengthwise view to indicate the overall positioning of said primary embodiment, which also includes the full penetration of said securing holes for said utility-loop, as being two separate embodiments so combined to perform as one as being unitary or as two (flanking) unilaterally; the multiplicity of holes also shown in these (four) figures aid in added floatation means.

Embodiment 60 as a primary and 60A when combined and as shown in FIG. 1 is followed lengendary-wise as primary embodiment 60 is inserted into shield-cover 60A having a multiplicity of holes 60B to aid in floatation means; which is followed by line-passage means 61, and hinge 62 so combined with push-lock 62A, is also followed by channeled securing holes 63, for a utility-loop 64AA and tow-line 64 which is also followed with a utility-ring 64B; (which is optional), while selfaligning V-shaped cavity 63A for storing of said tow-line 64, within the confines of open-throated storing cavity 66; while the bifurcating arms of primary embodiment appear as 65A, while its counterparting arm-tips of said shield-cover appear as 65AA when so combined as a further completed device. The utility loop 64AA is of such a size that it may be used as a life-saving device to persons in distress in water, and it may be positioned around a person in a sling-wise manner to assist in their rescue.

DESCRIPTION OF PREFERRED EMBODIMENTS

In the present embodiments of the invention hereinafter described in greater detail, FIG. 1 denotes the novel line holder-storer, which consists of a relatively flat form of such dimensions as 1.25 inches by 24.00 inches in thickness and overall length respectively, and mid-section 3.00 inches in width and 8.00 inches in length, which being juxtapositioned by end extremities, as handle and arms means each being 8.00 inches in length by 6.00 inches in width with some 4.00 inches recessed cavities whereby it must be understood that these figures are approximate without departing from the spirit and scope of the invention, if manufactured of wood or otherwise, or optionally inserting a so-called dummy-body within the innards of said outer-shelled body using the many types of plastics and synthetics, some floatable and widely known.

Having described my invention what I claim for United States letters patent is:

1. A laminated floatable substantially flat tow-line holder having a central body portion, a pair of clawlike bifurcated arms disposed at opposite ends of said central body portion, said arms at their distal ends defining open-throated substantially V-shaped chambers, said central body portion having one end of a bifurcated tow-line secured thereto forming a loop, with the other end of said tow-line being wound longitudinally for storage in each of said V-shaped chambers.

2. A tow-line holder according to claim 1 wherein said holder may be used as a life-saving device to persons in distress in water, said loop being of such size to permit positioning around a distressed person in a slingwise manner to assist rescue.

* * * * *